United States Patent
Otosaka

(10) Patent No.: US 7,633,608 B2
(45) Date of Patent: Dec. 15, 2009

(54) MEASUREMENT METHOD OF NON-CIRCULARITY OF CORE OPTICAL FIBER BASE MATERIAL AND APPARATUS THEREFOR

(75) Inventor: Tetsuya Otosaka, Gunma (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 384 days.

(21) Appl. No.: 10/593,875

(22) PCT Filed: Mar. 18, 2005

(86) PCT No.: PCT/JP2005/005018

§ 371 (c)(1),
(2), (4) Date: Sep. 22, 2006

(87) PCT Pub. No.: WO2005/090939

PCT Pub. Date: Sep. 29, 2005

(65) Prior Publication Data

US 2008/0192239 A1    Aug. 14, 2008

(30) Foreign Application Priority Data

Mar. 23, 2004   (JP) .............. 2004-084718
Jan. 18, 2005   (JP) .............. 2005-010585

(51) Int. Cl.
*G01N 21/00*   (2006.01)
*G01N 21/86*   (2006.01)
*G01V 8/00*    (2006.01)

(52) U.S. Cl. ................. 356/73.1; 250/559.24
(58) Field of Classification Search .......... None
See application file for complete search history.

(56) References Cited

U.S. PATENT DOCUMENTS 6,937,325 B2 *   8/2005   Ingles et al. .......... 356/73.1
2004/0227952 A1 *  11/2004   Jasapara et al. ......... 356/479

FOREIGN PATENT DOCUMENTS

| JP | 53129667 A | * | 11/1978 |
| JP | 62-14006 | | 1/1987 |
| JP | 4-331346 | | 11/1992 |
| JP | 2000-356570 | | 12/2000 |
| JP | 2003-42894 | | 2/2003 |
| JP | 2003042894 A | * | 2/2003 |
| JP | 2005164491 A | * | 6/2005 |

* cited by examiner

Primary Examiner—Gregory J Toatley, Jr.
Assistant Examiner—Gordon J Stock, Jr.
(74) Attorney, Agent, or Firm—McGinn IP Law Group, PLLC

(57) ABSTRACT

A method for measuring non-circularity of a core part of an optical fiber base material having the core part and a clad part includes immersing the optical fiber base material in liquid having a refractive index substantially equal to that of the clad part of the optical fiber base material; irradiating parallel light from a side face of the optical fiber base material to measure intensity distribution of transmitted light; measuring a width of a dark space caused by light passing the core part on intensity distribution to obtain a relative value for a core diameter; rotating the optical fiber base material to further obtain the relative value for the core diameter at plural points for a circumferential direction; and obtaining non-circularity of the core part based on the obtained plurality of relative values for the core diameter.

23 Claims, 8 Drawing Sheets

PRIOR ART

PRIOR ART

US 7,633,608 B2

MEASUREMENT METHOD OF NON-CIRCULARITY OF CORE OPTICAL FIBER BASE MATERIAL AND APPARATUS THEREFOR

TECHNICAL FIELD

The present invention relates to a measurement method of non-circularity of a core of an optical fiber base material and an apparatus therefor.

The present application also relates to the following applications, the contents of which are incorporated herein by reference if applicable.

Japanese Patent Application No. 2004-84718, filed on Mar. 23, 2004

Japanese Patent Application No. 2005-10585, filed on Jan. 18, 2005

BACKGROUND ART

In recent years, there has been regarded an influence of polarization mode dispersion (hereinafter, referred to as PMD) as a factor limiting long-distance transmission and speeding up of optical communication. PMD means a phenomenon that two modes having planes of polarization perpendicular to each other propagate through a fiber at a slightly different speed and thus a width of incident pulse enlarges as the incident pulse propagates through the fiber.

A normal single mode optical fiber has a core part and a clad part having a refractive index smaller than that of the core part on the outer circumference, and incident light is approximately confined within the core part and advances in such a state. When a core part is perfectly a complete round, these two modes cannot be distinguished due to degeneracy. However, when a core part is not a complete round or distortion is added to the core part in a step manufacturing an optical fiber or an optical cable, the two modes propagating through the optical fiber have a different speed and thus PMD occurs because a symmetric property is broken.

If an influence of PMD becomes large, signal light pulses different from each other are overlapped during optical communication and thus sometimes the detection of signal light pulse becomes impossible. Therefore, it becomes important to closely manage non-circularity of an optical fiber core part when a PMD characteristic is strictly requested particularly.

Non-circularity of a core part of an optical fiber can be measured by means of, e.g., a near field image method. However, since a diameter of a core part of a single mode optical fiber is extremely small in the order of 10 μm to the utmost, this lacks for measurement accuracy and the measurement of non-circularity is easy to be influenced by a state of a measuring plane when the optical fiber has been cut. Therefore, it is desirable that non-circularity of a core part is measured in a step for a preform for optical fiber (hereinafter, simply referred to as a preform).

Non-circularity of a preform can be obtained, e.g., by measuring an outside diameter of the preform from a plurality of directions by means of a laser beam diameter measurement device while rotating the preform and dividing a difference between a maximum value and a minimum value of the obtained outside diameter data by a mean value. In addition, it is possible to calculate an expression of an ellipse by means of a least-squares method or the like and obtain non-circularity from length of a major axis and a minor axis and a mean value therefor.

However, non-circularity of a core part of a preform cannot be measured by the above method because the core part is usually synthesized integrally with a part of a clad part.

Patent Document 1 proposes a method of obtaining non-circularity of a core part based on light intensity distribution for image capturing obtained by horizontally arranging an optical fiber base material 2 so that the base material penetrates a vessel 1 filled with liquid having a refractive index substantially equal to that of a clad part, irradiating parallel light from a light source section 3 toward a side face of the optical fiber base material 2, and receiving the transmitted light by a light receiving section 4, as shown in FIG. 1. This method is to measure a width of a bright space of light intensity distribution to obtain a relative value for a core diameter and obtain non-circularity of a core part from this relative value.

[Patent Document 1] Japanese Patent Application Publication No. 2003-42894

DISCLOSURE OF THE INVENTION

Problems to be Solved by the Invention

However, according to a method of Patent Document 1 of recognizing a bright space condensed by a core to obtain non-circularity of a core part, an inserting section of the vessel 1 is sealed by a packing material having elasticity so that matching oil within the vessel 1 (liquid having a refractive index substantially equal to that of a clad part) does not leak from the inserting section of the optical fiber base material 2. However, when measuring plural points in a longitudinal direction of the optical fiber base material 2, the matching oil may leak if the vessel 1 is relatively moved.

Furthermore, according to a method of Patent Document 1, as shown in FIG. 2, since a boundary showing a width "a" of a bright space condensed by a core becomes indistinct depending on a refractive index difference between a core 5 and a clad 6 and an interval between a light projector 3 and a photoreceiver 4, the detection of a width of a bright space may be difficult or impossible.

Moreover, a value computed in a method explained in claim 2 and FIG. 3 of Patent Document 1 shows a thing different from non-circularity based on an elliptical shape. The reason is that a thick portion and a thin portion are respectively observed by two times when rotating an ellipse by 360 degrees. In claim 2 and FIG. 3 of Patent Document 1, a thick portion and a thin portion are respectively observed by only one time.

In view of the situation above, an object of the present invention is to provide a measurement method of non-circularity of a core part of an optical fiber base material and an apparatus therefor, which can accurately and easily measure non-circularity of the core part, regardless of a refractive index difference between a core and a clad and an interval between a light projector and a photoreceiver.

Means for Solving the Problems

There is provided a method for measuring non-circularity of a core part of an optical fiber base material having the core part and a clad part. The method includes the steps of: immersing the optical fiber base material in liquid having a refractive index substantially equal to that of the clad part of the optical fiber base material; irradiating parallel light from a side face of the optical fiber base material to measure intensity distribution of transmitted light; measuring a width of a dark space caused by light passing the core part on intensity distribution to obtain a relative value for a core diameter; rotating the optical fiber base material to further obtain the relative value for the core diameter at plural points for a circumferential direction; and obtaining non-circularity of the core part based on the obtained plurality of relative values for the core diameter.

In the present invention, it is preferable that a width of a dark space caused by light passing a core part is measured by means of a parallel light projection type diameter measurement device (for example, LS-7500 made in Keyence company) capable of adjusting a detection threshold value.

Non-circularity of a core part is obtained by dividing a difference between a maximum value and a minimum value of relative values $D_c(\phi)$ for a core diameter measured from a plurality of circumferential directions $\phi$ by a mean value of relative values $D_c(\phi)$ for a core diameter, or computing $2B/A$ by means of A and B obtained by fitting $D_c(\phi)$ and $\phi$ to $D_c(\phi)=A+B\sin 2\phi$. The former shows the maximum non-circularity that can be thought from a measured value, and the latter becomes non-circularity made by extracting only an ellipse component.

The latter computation can use Fourier analysis or high-speed Fourier analysis. A merit using Fourier analysis or high-speed Fourier analysis is to be able to easily obtain a fitting result, which is made by completely removing a low level component (a component of $\sin\phi$) and a high level component ($\sin 3\phi$, $\sin 4\phi$, $\sin 5\phi$, ...), by only computation.

The measurement of non-circularity of a core part is performed in a state where the optical fiber base material is vertically arranged, and a portion of a vessel accommodating liquid, which is passed through by parallel light and the transmitted light at least irradiated on the optical fiber base material, consists of a material having a refractive index substantially equal to that of a clad part, preferably a material equal to that of a clad part.

The vessel accommodating liquid has a parallel outer surface opposite to the portion passed through by parallel light and the transmitted light at least irradiated on the optical fiber base material. Furthermore, it is preferable that a cylindrical hole is provided in a center of the vessel, and the parallel outer surface and an inner surface of cylindrical hole facing each other of the vessel are polished.

Temperature of liquid within the vessel and temperature of an atmosphere in which a core non-circularity measuring apparatus is provided are substantially constantly regulated.

There is provided an apparatus for measuring non-circularity of a core part of an optical fiber base material having the core part and a clad part. The apparatus includes: means for immersing the optical fiber base material in liquid having a refractive index substantially equal to that of the clad part of the optical fiber base material; means for irradiating parallel light toward a side face of the optical fiber base material immersed in the liquid; means for measuring intensity distribution of transmitted light passing through the optical fiber base material; means for measuring a width of a dark space caused by light passing the core part on intensity distribution to obtain a relative value for a core diameter; and means for rotating the optical fiber base material to measure relative values for the core diameter at plural points for a circumferential direction of the optical fiber base material, in which the non-circularity of the core part is obtained based on the plurality of relative values for the core diameter.

The measurement apparatus of non-circularity of a core part according to the present invention has means for vertically supporting the optical fiber base material, and a portion of the vessel accommodating liquid, which is passed through by parallel light and the transmitted light at least irradiated on the optical fiber base material, consists of a material having a refractive index substantially equal to that of a clad part, preferably the same material. Moreover, at least a portion of the vessel passed through by irradiated light and transmitted light has a parallel outer surface facing each other, and preferably a cylindrical hole is provided in the center and the outer surface and an inner surface of cylindrical hole are polished.

Means for obtaining a relative value for a core diameter can use a parallel light projection type diameter measurement device and a preform analyzer (a refractive index distribution measuring device) that can adjust a detection threshold value. The control and arithmetic processing of each means are performed in a control and arithmetic unit. The measurement of refractive index distribution and non-circularity of a core part can be efficiently performed in the same apparatus by building the present measuring system in a preform analyzer.

EFFECTS OF THE INVENTION

According to a measurement method of non-circularity of a core part of an optical fiber base material and an apparatus therefor of the present invention, it is possible to accurately and easily measure non-circularity of a core part of an optical fiber base material.

DESCRIPTION OF SYMBOLS

Figure 1:
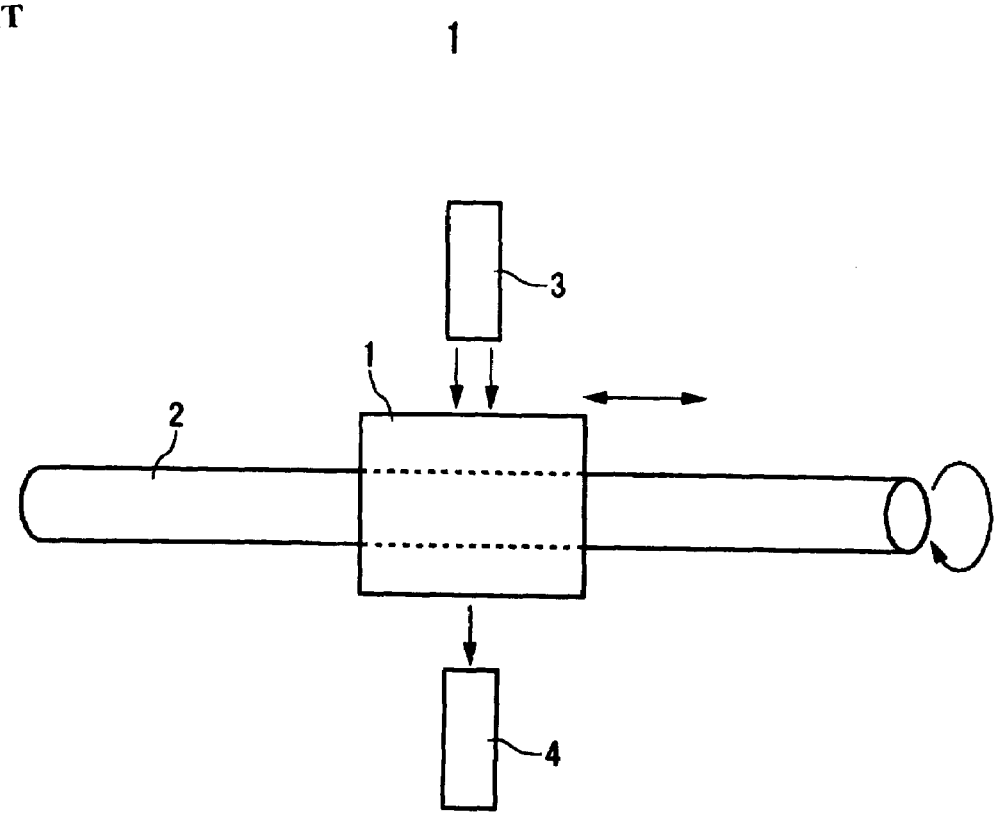
FIG. 1 is a schematic diagram explaining a measurement method of non-circularity of a core according to a conventional art.

1 ... vessel
2 ... optical fiber base material
3 ... light projector
4 ... photoreceiver
5 ... core
6 ... clad
7 ... hanging part
8 ... matching oil
9 ... cell
10 ... oil tank
11 ... light irradiating section
12 ... light detecting section 13 . . . laser beam (LED diffusion light)
14 . . . cylindrical hole
15 . . . laser source for preform analyzer
16 . . . photoreceiver for preform analyzer
17 . . . light projector for measuring non-circularity of core part
18 . . . photoreceiver for measuring non-circularity of core part

BEST MODE FOR CARRYING OUT THE INVENTION

The invention will now be described based on the preferred embodiments, which do not intend to limit the scope of the present invention, but exemplify the invention. All of the features and the combinations thereof described in the embodiment are not necessarily essential to the invention.

A measurement method of non-circularity of a core part of the present invention is to irradiate parallel light from a side face of an optical fiber base material, measure a dark space of light intensity distribution in a plurality of circumferential directions $\phi$ of the optical fiber base material to obtain a relative value $D_c(\phi)$ for a core diameter, and divide a difference between a maximum value and a minimum value of relative values for a core diameter by a mean value of the relative values for a core diameter or calculate 2B/A by means of A and B obtained by fitting $D_c(\phi)$ and $\phi$ to $D_c(\phi)=A+B\sin2\phi$, in order to obtain non-circularity of a core part, and light intensity distribution can be measured by a parallel light projection type diameter measurement device that can adjust a detection threshold value.

Figure 5:
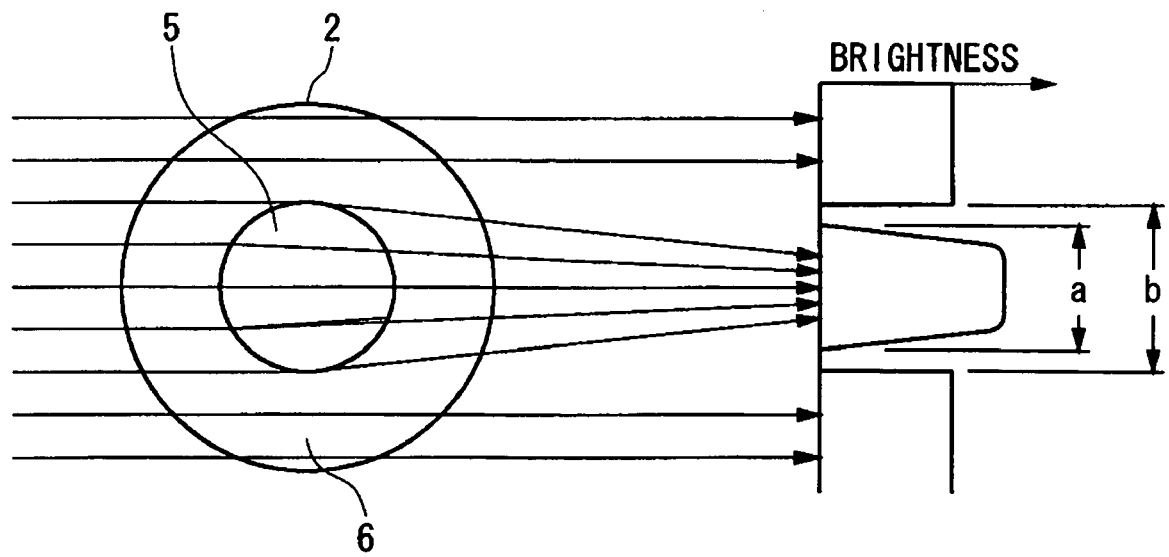
FIG. 5 is a schematic diagram explaining light intensity distribution according to the present invention.

According to light intensity distribution as shown in FIG. 5, when parallel light is irradiated on the optical fiber base material, light passing through a clad 6 goes straight ahead and light passing through a core 5 having a high refractive index converges. For this reason, in a light receiving face, bright space "a" and dark space "b" occur in a boundary between a clad part and a core part.

Figure 2:
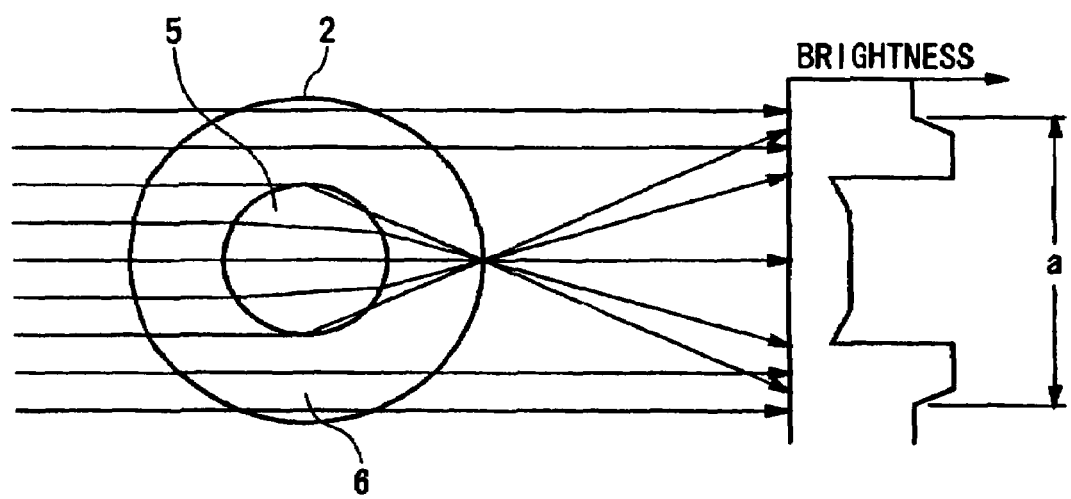
FIG. 2 is a schematic diagram explaining light intensity distribution according to a conventional art.

However, when a refractive index difference between the core and the clad is large or when a photoreceiver is located more posteriorly, a focal position is in front of the photoreceiver, and an outline of bright space "a" becomes indistinct and thus may not be recognized at all, as described in FIG. 2.

Figure 6:
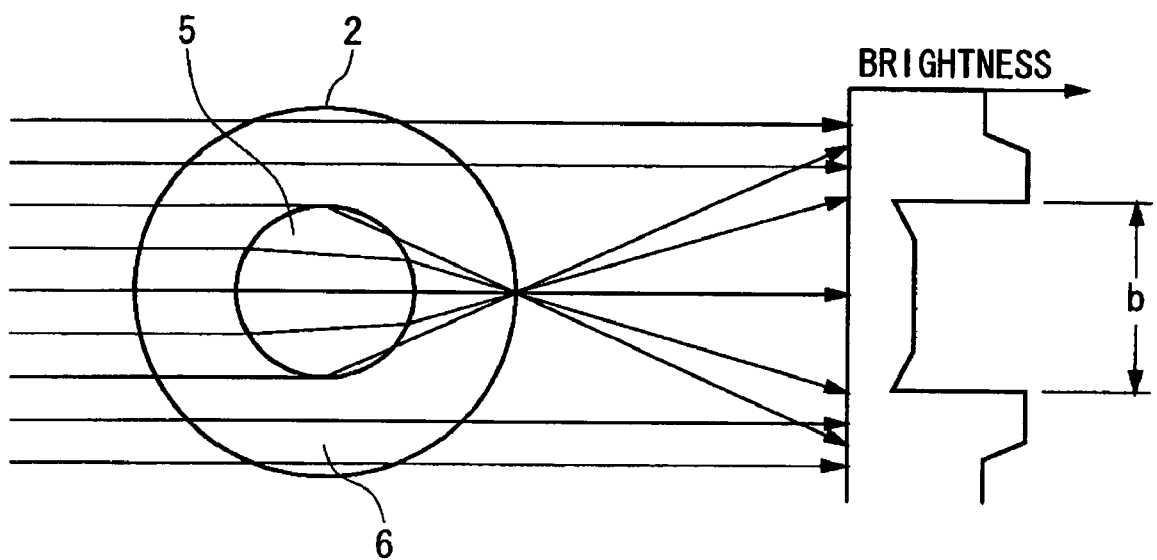
FIG. 6 is a schematic diagram explaining light intensity distribution according to the present invention.

Thus, when a relative diameter of a core part is recognized by means of a width of dark space "b" shown in FIG. 6 even if the outline of bright space "a" is indistinct, the outline of bright space can be recognized regardless of the refractive index difference between the core and the clad and a position of the photoreceiver. At this time, by adjusting a detection threshold value of the light receiving section, the position of this dark space b can be surely detected and precisely measured for a preform of various outside diameters for core and core/clad ratios.

Hereinafter, it will be described in detail about a measurement method and a measurement apparatus of non-circularity of a core part of the present invention. However, the present invention is not limited to these matters and can have various aspects.

Figure 3:
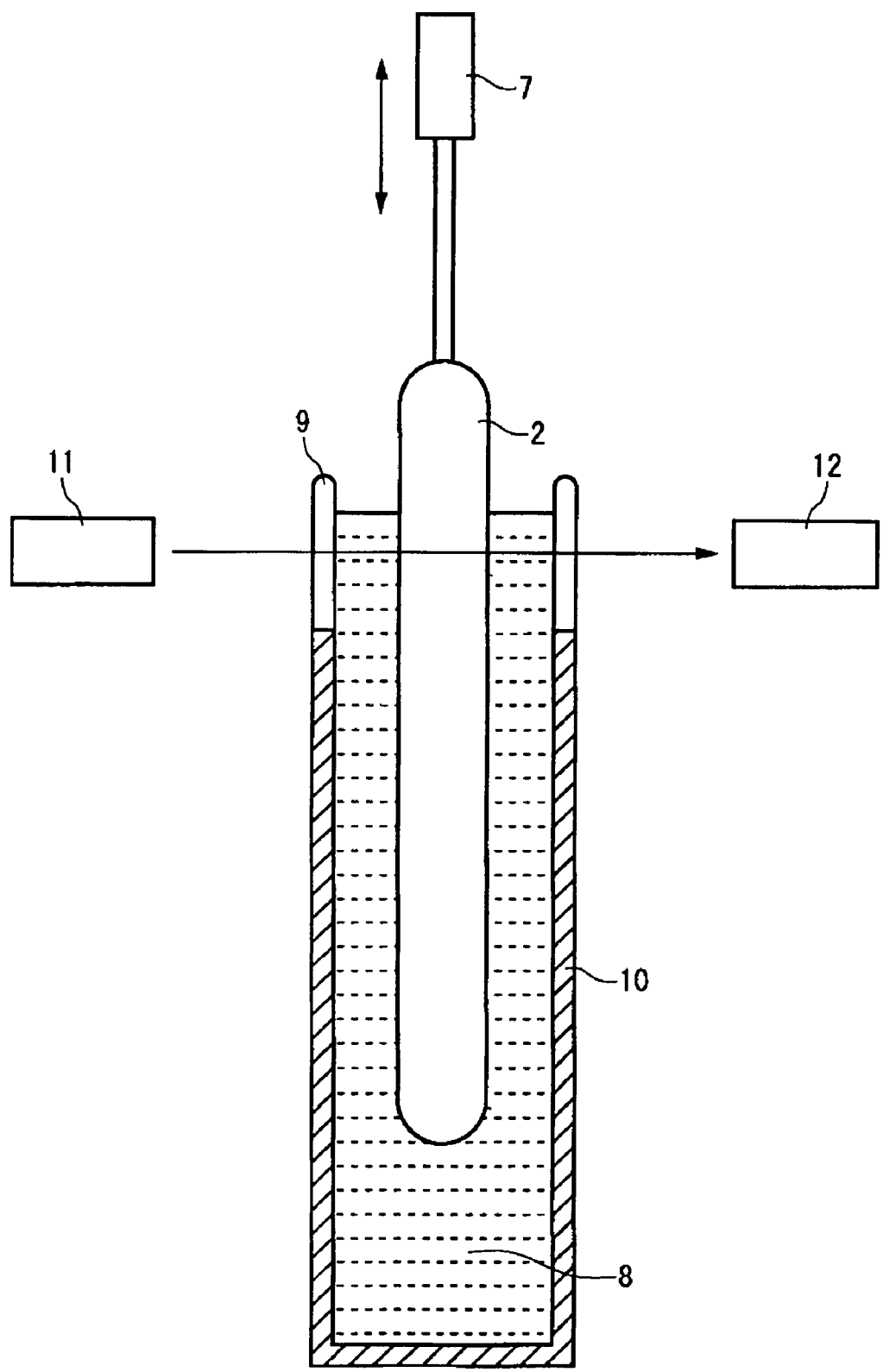
FIG. 3 is a schematic diagram showing a measurement apparatus of non-circularity of a core used in the present invention.

At first, as shown in FIG. 3, light intensity distribution in a diametrical direction of the optical fiber base material 2 is obtained by immersing the optical fiber base material 2 vertically mounted on a hanging part 7 including a revolution/up-and-down motion mechanism in an oil tank 10 including a cell 9 filled with matching oil 8 and irradiating parallel light from a light irradiating section 11 toward the optical fiber base material 2 from the lateral side, in order to measure light intensity of transmitted light using a light detecting section 12.

In this manner, since the optical fiber base material 2 is vertically immersed in the oil tank 10 of which an upper side is opened, the matching oil 8 does not leak like Patent Document 1. Furthermore, since an optical measurement section is located at an upper end of the oil tank 10, it is possible to easily measure various positions in a longitudinal direction by moving up and down the optical fiber base material 2. Furthermore, it is possible to measure light intensity distribution at an arbitrary position in a circumferential direction by rotating the optical fiber base material 2 in the hanging part 7.

The matching oil 8 is adjusted with the substantially same refractive index as that of a clad part of the optical fiber base material 2.

Figure 4:
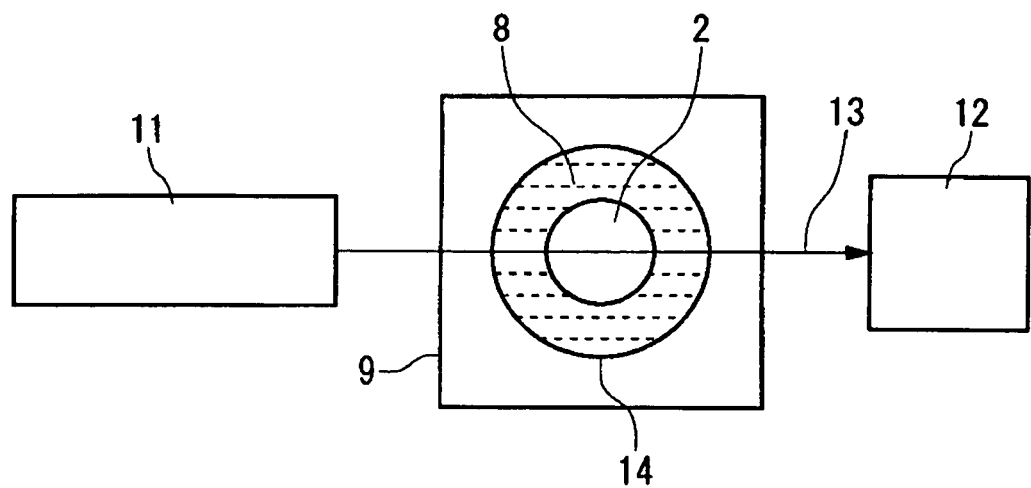
FIG. 4 is a schematic diagram explaining an optical measurement section of a measurement apparatus of non-circularity of a core used in the present invention.

The optical measurement section can use a parallel light projection type diameter measurement device as shown in FIG. 4. This section includes the light irradiating section 11 for irradiating parallel light, e.g., laser beam or LED diffusion light 13 on the optical fiber base material 2 and the light detecting section 12 for detecting transmitted light passing through the transparent cell 9 filled with the matching oil 8 and the optical fiber base material 2.

In addition, the light detecting section 12 can adjust a detection threshold value of transmitted light, and thus a dark space produced on a core outer circumference of light intensity distribution can be clearly recognized and the precise measurement of a relative value for a core diameter becomes possible.

It is assumed that the cell 9 consists of a material having a refractive index substantially equal to that of a clad part, preferably a material equal to that of a clad part, in order to prevent an error by optical refraction between the matching oil 8 and the cell material. Furthermore, an outer surface of the cell 9 is formed so that an incident plane and an outgoing plane of light are parallel to each other and form vertical planes for incident light and outgoing light, in order to prevent optical refraction in the cell 9.

In addition, since the refractive index of the matching oil 8 varies with temperature, measurement accuracy can be improved by substantially constantly regulating temperature of an atmosphere in which the optical measurement section is provided and temperature of the matching oil 8.

The optical fiber base material 2 is put in a cylindrical hole 14 that is provided in a center of the cell 9 and is filled with the matching oil 8. However, according to such a configuration, it is possible to reduce an error caused by a refractive index difference between a clad part of the optical fiber base material 2 and the matching oil 8.

It is possible to further improve measurement accuracy when polishing an outer surface of the cell 9 and an inner surface of the cylindrical hole 14.

Figure 9:
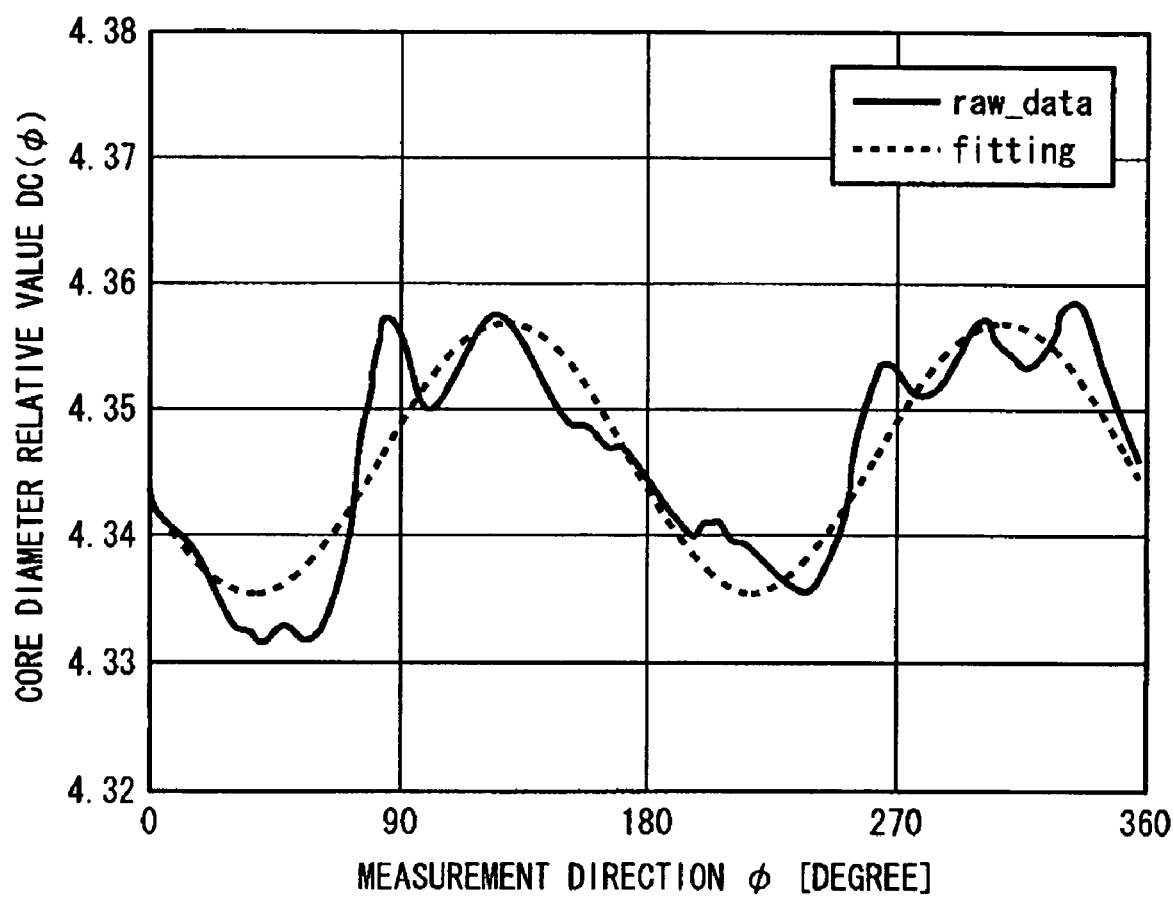
FIG. 9 is a graph showing an example of measuring a dark space of light intensity distribution from a plurality of circumferential directions $\phi$ and obtaining a relative value $D_c(\phi)$ for a core diameter.

FIG. 9 shows an example of measuring a dark space of light intensity distribution in a plurality of circumferential directions $\phi$ of the optical fiber base material to obtain a relative value $D_c(\phi)$ for a core diameter by means of an apparatus with the above configuration. In the present drawing, a solid line is based on a measured value and a dotted line is obtained by fitting.

The non-circularity of a core part is calculated to 0.61% when a difference between a maximum value and a minimum value of relative values for a core diameter is divided by a mean value of the relative values for a core diameter. As shown with a dotted line, when non-circularity of a core part is obtained by computing 2B/A using A and B obtained by fitting $D_c(\phi)$ and $\phi$ to $D_c(\phi)=A+B\sin2\phi$, the non-circularity is computed to 0.49% from A=4.346 and B=0.0106.

The reason by which the non-circularity of a core part is reduced in case of computing the non-circularity by fitting to $D_c(\phi)=A+B\sin2\phi$ is that low-level and high-level sin components exist. It is considered that a low-level component is a noise component caused by a measurement apparatus and a high-level component shows a real core shape.

In addition, it is possible to incorporate a preform analyzer into a measurement apparatus of non-circularity of a core part of the present invention and share a cell, up-and-down motion mechanism, rolling mechanism.

Figure 7:
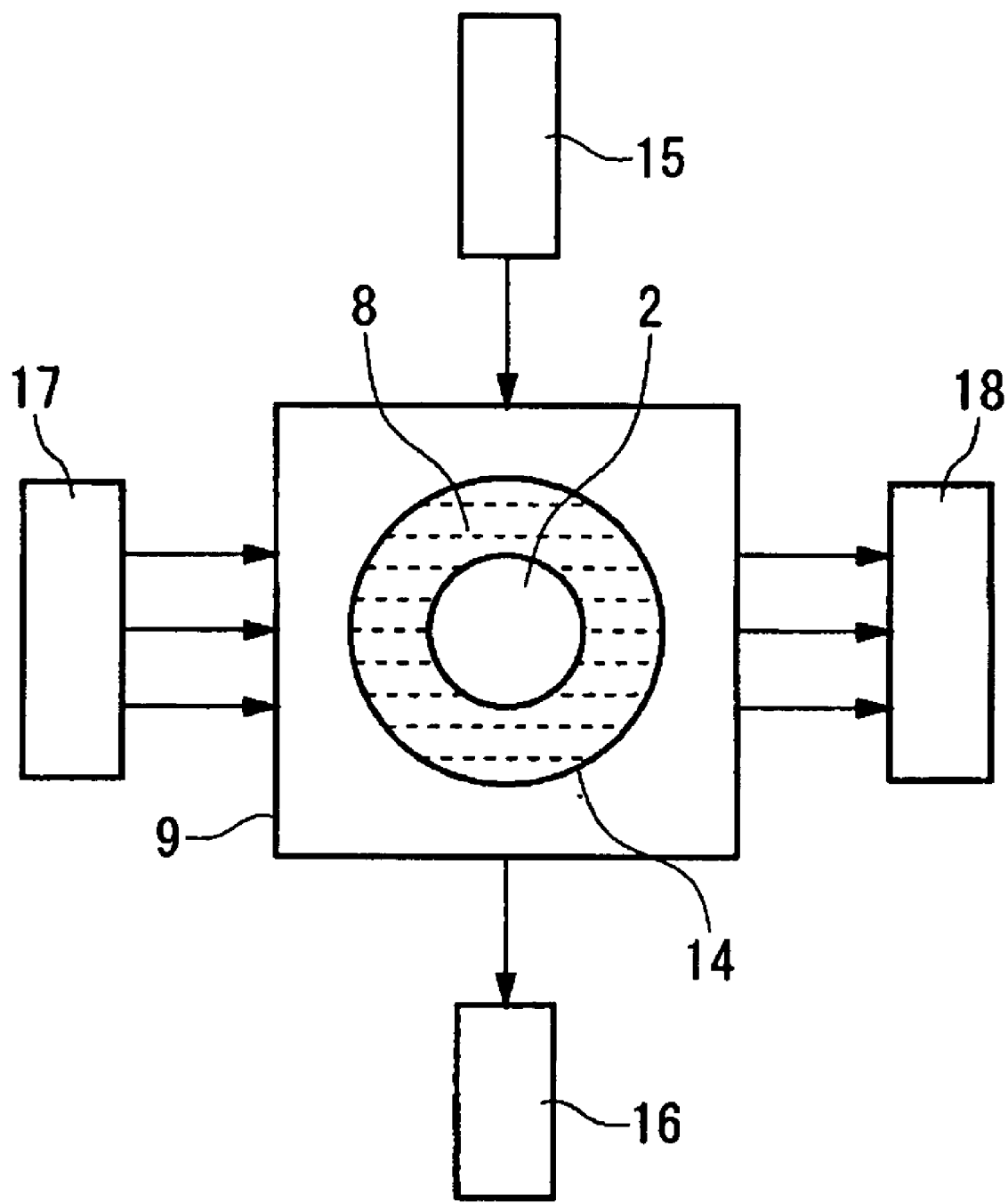
FIG. 7 is a schematic diagram explaining another example of an optical system of a measurement apparatus according to the present invention.
Figure 8:
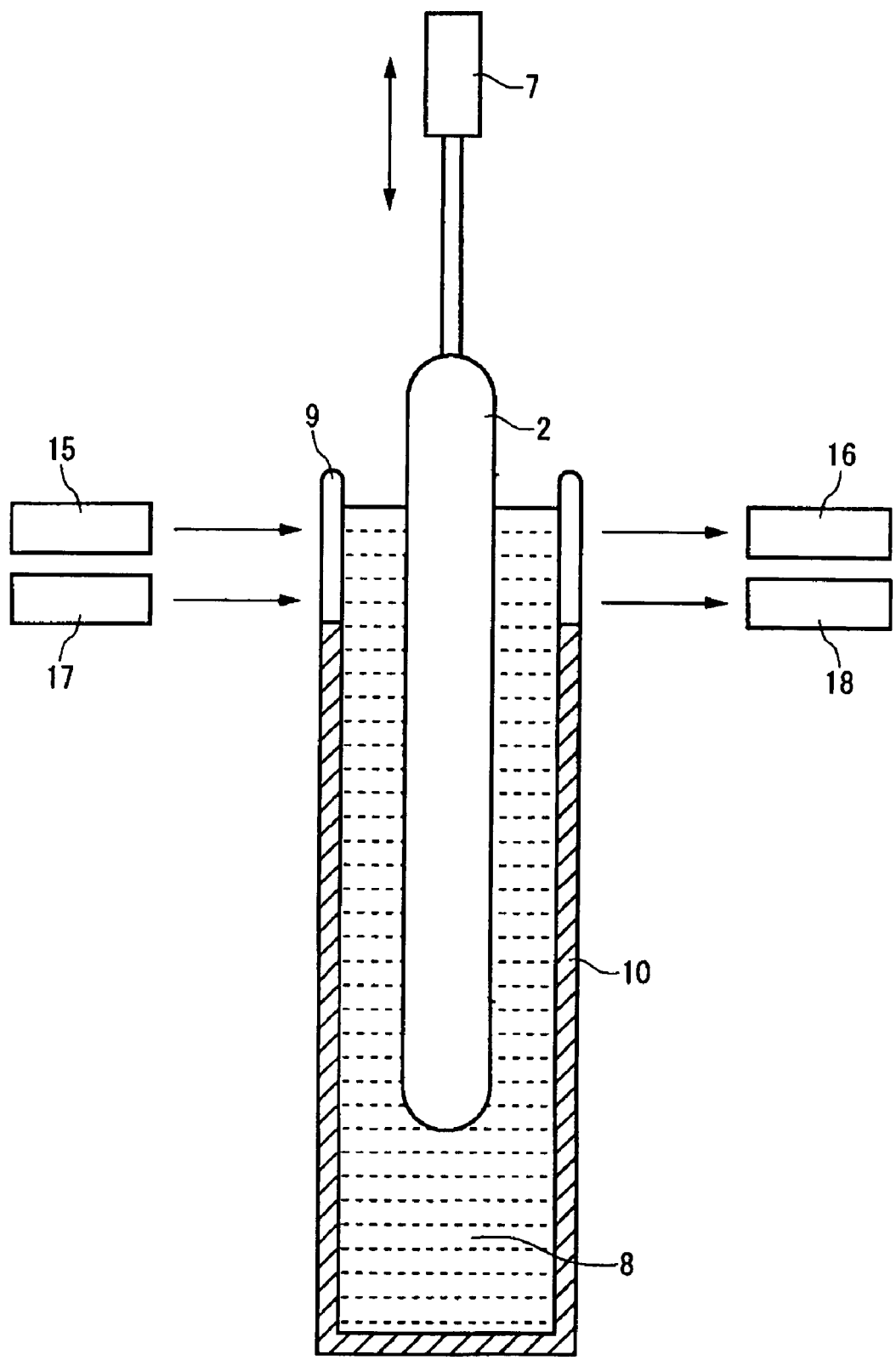
FIG. 8 is a schematic diagram explaining further another example for an optical system of a measurement apparatus according to the present invention.

For example, as shown in FIG. 7, an optical system consisting of a laser source 15 for preform analyzer and the photoreceiver 16 and an optical system consisting of a light projector 17 for measuring non-circularity of core part and the photoreceiver 18 can be arranged perpendicularly to each other, and as shown in FIG. 8 these optical systems can be arranged up and down. According to such a configuration, it is possible to prepare a set of work-pieces or the like in common and thus improve efficiency of measurement.

Although the present invention has been described by way of an exemplary embodiment, it should be understood that those skilled in the art might make many changes and substitutions without departing from the spirit and the scope of the present invention. It is obvious from the definition of the appended claims that embodiments with such modifications also belong to the scope of the present invention.

INDUSTRIAL APPLICABILITY

According to the present invention, since it is possible to preliminarily check an optical fiber base material provided to drawing efficiently and accurately. It is extremely useful for a manufacture management of an optical fiber.

The invention claimed is:

1. A measurement method for measuring non-circularity of a core part of an optical fiber base material having the core part and a clad part, the method comprising:
immersing the optical fiber base material in liquid having a refractive index substantially equal to that of the clad part of the optical fiber base material;
irradiating parallel light from a side face of the optical fiber base material to measure an intensity distribution of transmitted light;
measuring a width between two change points, at which two bright spaces corresponding to the clad part are changed to a dark space and which correspond to two boundaries between the clad part and the core part, on the intensity distribution to obtain a relative value for a core diameter;
rotating the optical fiber base material to further obtain the relative value for the core diameter at plural points for a circumferential direction; and
obtaining non-circularity of the core part based on the obtained plurality of relative values for the core diameter.

2. The measurement method of non-circularity of a core part of an optical fiber base material as claimed in claim 1, wherein the non-circularity of the core part is obtained by dividing a difference between a maximum value and a minimum value for the relative values for the core diameter measured from the plurality of circumferential directions by a mean value for the relative values for the core diameter.

3. The measurement method of non-circularity of a core part of an optical fiber base material as claimed in claim 1, wherein the measurement of non-circularity of the core part is performed by vertically arranging the optical fiber base material.

4. The measurement method of non-circularity of a core part of an optical fiber base material as claimed in claim 1, wherein a portion of a vessel accommodating liquid, which is passed through by parallel light and the transmitted light at least irradiated on the optical fiber base material, consists of a material having a refractive index substantially equal to that of the clad part.

5. The measurement method of non-circularity of a core part of an optical fiber base material as claimed in claim 1, wherein a portion of a vessel accommodating liquid, which is passed through by parallel light and the transmitted light at least irradiated on the optical fiber base material, consists of a material equal to that of the clad part.

6. The measurement method of non-circularity of a core part of an optical fiber base material as claimed in claim 1, wherein the liquid in a vessel is regulated to constant temperature.

7. The measurement method of non-circularity of a core part of an optical fiber base material as claimed in claim 1, wherein temperature of an atmosphere in which a core non-circularity measuring apparatus is provided is substantially constantly regulated.

8. The measurement method of non-circularity of a core part of an optical fiber base material as claimed in claim 1, wherein the width between the change points is measured by a parallel light projection type diameter measurement device.

9. The measurement method of non-circularity of a core part of an optical fiber base material as claimed in claim 1, wherein the relative value $D_c(\phi)$ for the core diameter measured from the plurality of circumferential directions is fitted to $D_c(\phi)=A+B\sin2\phi$, and the non-circularity of the core part is set to 2B/A.

10. The measurement method of non-circularity of a core part of an optical fiber base material as claimed in claim 1, wherein a vessel accommodating liquid has a parallel outer surface opposite to a portion passed through by parallel light and the transmitted light at least irradiated on the optical fiber base material, and a cylindrical hole is provided in a center of the vessel.

11. The measurement method of non-circularity of a core part of an optical fiber base material as claimed in claim 8, wherein the parallel light projection type diameter measurement device can adjust a detection threshold value.

12. The measurement method of non-circularity of a core part of an optical fiber base material as claimed in claim 9, wherein the fitting uses Fourier analysis or high-speed Fourier analysis.

13. The measurement method of non-circularity of a core part of an optical fiber base material as claimed in claim 10, wherein the parallel outer surface and an inner surface of the cylindrical hole facing each other are polished.

14. A measurement apparatus for measuring non-circularity of a core part of an optical fiber base material having the core part and a clad part, the apparatus comprising:
means for immersing the optical fiber base material in liquid having a refractive index substantially equal to that of the clad part of the optical fiber base material;
means for irradiating parallel light toward a side face of the optical fiber base material immersed in the liquid;
means for measuring an intensity distribution of transmitted light passing through the optical fiber base material;
means for measuring a width between two change points, at which two bright spaces corresponding to the clad part are changed to a dark space and which correspond to two boundaries between the clad part and the core part on the intensity distribution to obtain a relative value for a core diameter; and means for rotating the optical fiber base material to measure relative values for the core diameter at plural points for a circumferential direction of the optical fiber base material, wherein the non-circularity of the core part is obtained based on the plurality of relative values for the core diameter.

15. The measurement apparatus of non-circularity of a core part of an optical fiber base material as claimed in claim 14, further comprising means for vertically supporting the optical fiber base material.

16. The measurement apparatus of non-circularity of a core part of an optical fiber base material as claimed in claim 14, wherein a portion of a vessel accommodating liquid, which is passed through by parallel light and the transmitted light at least irradiated on the optical fiber base material, consists of a material having a refractive index substantially equal to that of the clad part.

17. The measurement apparatus of non-circularity of a core part of an optical fiber base material as claimed in claim 14, wherein a portion of a vessel accommodating liquid, which is passed through by parallel light and the transmitted light at least irradiated on the optical fiber base material, consists of a material equal to that of the clad part.

18. The measurement apparatus of non-circularity of a core part of an optical fiber base material as claimed in claim 14, further comprising a preform analyzer.

19. The measurement apparatus of non-circularity of a core part of an optical fiber base material as claimed in claim 14, further comprising a control and arithmetic unit for performing control and arithmetic processing for each means.

20. The measurement apparatus of non-circularity of a core part of an optical fiber base material as claimed in claim 14, wherein said means for obtaining a relative value for a core diameter is a parallel light projection type diameter measurement device.

21. The measurement apparatus of non-circularity of a core part of an optical fiber base material as claimed in claim 14, wherein a vessel accommodating liquid has a parallel outer surface opposite to a portion passed through by parallel light and the transmitted light at least irradiated on the optical fiber base material, and a cylindrical hole is provided in a center of the vessel.

22. The measurement apparatus of non-circularity of a core part of an optical fiber base material as claimed in claim 15, wherein the parallel light projection type diameter measurement device can adjust a detection threshold value.

23. The measurement apparatus of non-circularity of a core part of an optical fiber base material as claimed in claim 21, wherein the parallel outer surface and an inner surface of the cylindrical hole facing each other are polished.

\* \* \* \* \*